United States Patent
Schultz

(10) Patent No.: US 8,548,208 B2
(45) Date of Patent: *Oct. 1, 2013

(54) MULTIFACTOR MULTIMEDIA BIOMETRIC AUTHENTICATION

(75) Inventor: Paul T. Schultz, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/460,551

(22) Filed: Apr. 30, 2012

(65) Prior Publication Data

US 2012/0262275 A1    Oct. 18, 2012

Related U.S. Application Data

(63) Continuation of application No. 11/936,479, filed on Nov. 7, 2007, now Pat. No. 8,189,878.

(51) Int. Cl.
*G06K 9/00* (2006.01)
*G05B 19/00* (2006.01)
*G06F 21/00* (2006.01)

(52) U.S. Cl.
USPC ........... 382/115; 382/118; 340/5.8; 340/5.82; 713/186

(58) Field of Classification Search
USPC ............... 382/115, 116, 118; 340/82, 5.53, 340/10.1, 5.52, 572.1, 5.4, 5.82, 5.61, 5.6, 340/5.8; 235/487, 380, 492, 493, 382, 451; 705/64, 72, 40, 44; 713/186, 169, 170, 171; 707/E17.096
See application file for complete search history.

(56) References Cited

U.S. PATENT DOCUMENTS

| | | | |
|---|---|---|---|
| 5,719,950 A | 2/1998 | Osten et al. | |
| 7,606,396 B2 | 10/2009 | Miller et al. | |
| 7,624,417 B2 | 11/2009 | Dua | |
| 7,702,918 B2 | 4/2010 | Tattan et al. | |
| 8,189,878 B2 * | 5/2012 | Schultz | 382/115 |
| 2001/0032335 A1 | 10/2001 | Jones | |
| 2010/0226361 A1 | 9/2010 | Betti et al. | |

OTHER PUBLICATIONS

L. Zyga, 'Face pass' is latest security system for NEC laptops, PHYSORG.com, http://www.physorg.com/news108136813.html, printed on Oct. 23, 2007, 1 page.
Federal Financial Institutions Examination Council, "Authentication in an Internet Banking Environment", http://www.ffiec.gov/pdf/authentication_guidance.pdf, printed on Nov. 7, 2007, 14 pages.

* cited by examiner

*Primary Examiner* — Sheela Chawan

(57) ABSTRACT

A device may receive a request to authenticate a user, automatically establish a multimedia session with the user in response to receiving the request, and capture a group of biometric identifiers for the user from the multimedia session. The device may further perform a group of biometric authentication operations using the analyzed or captured biometric identifiers to obtain a group of authentication scores, determine whether the user is properly authenticated based on the group of authentication scores, and transmit a message representing the determination of whether the user is properly authenticated.

20 Claims, 16 Drawing Sheets

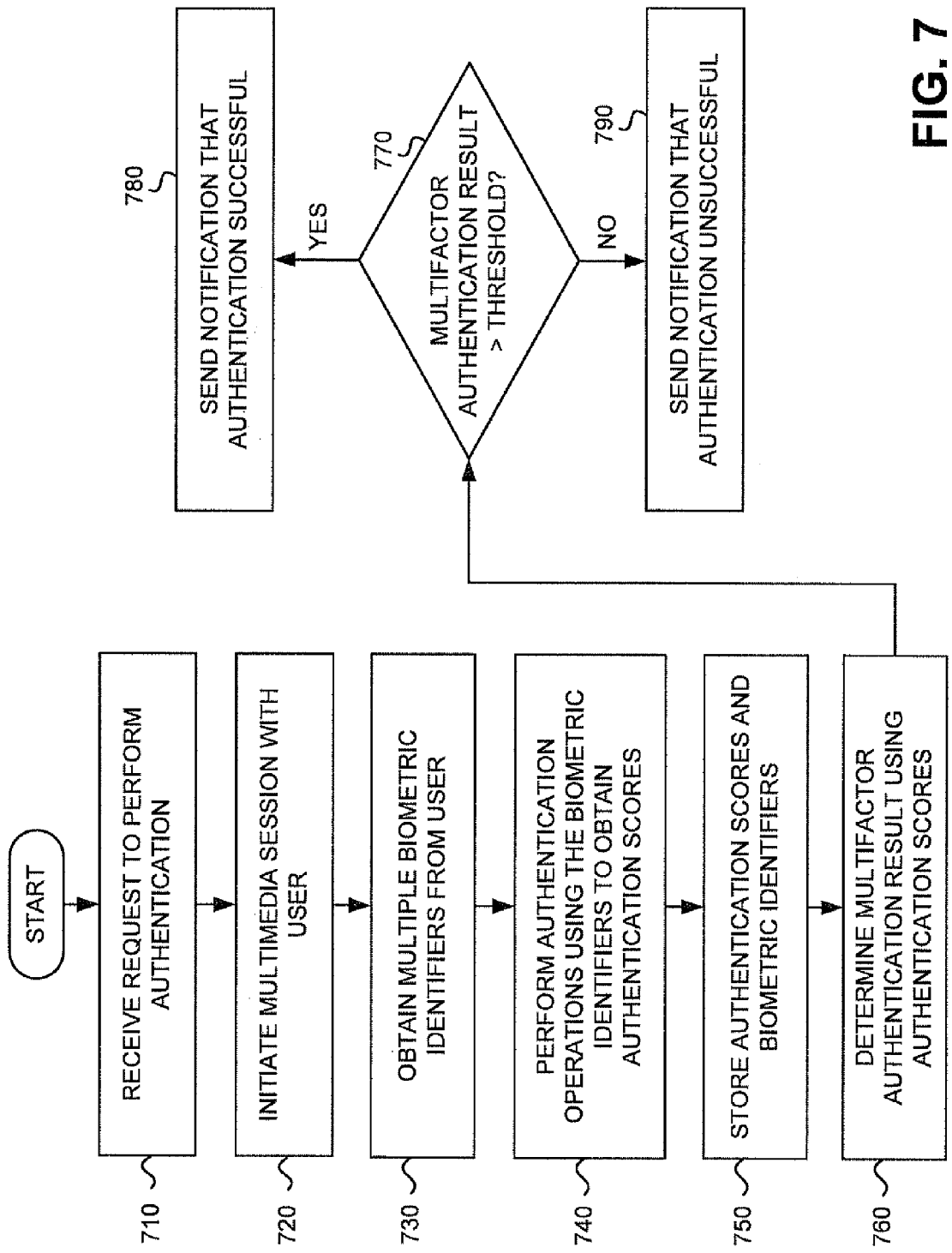

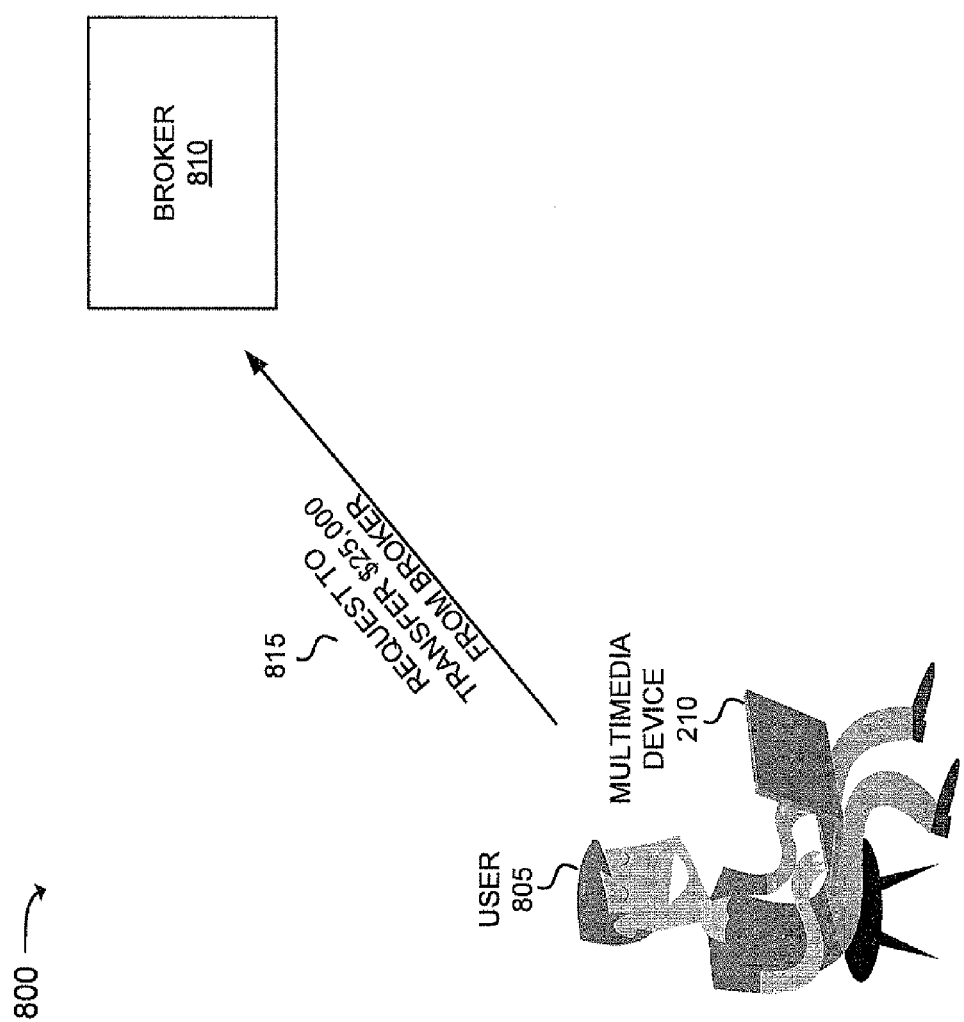

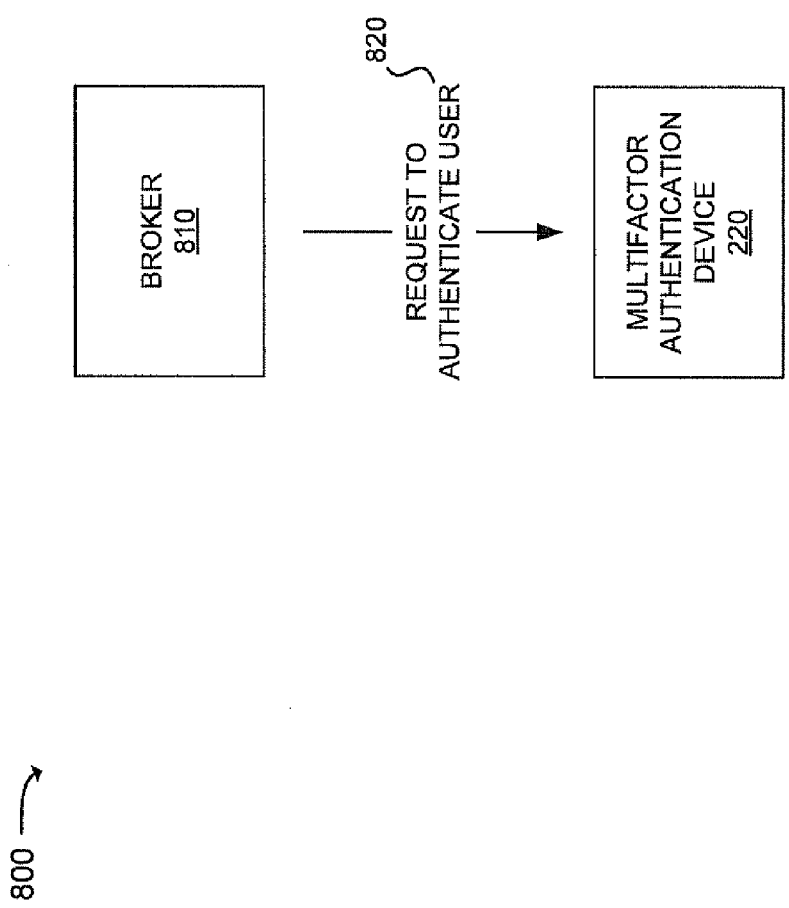

MULTIFACTOR MULTIMEDIA BIOMETRIC AUTHENTICATION

RELATED APPLICATION

This application is a continuation of U.S. patent application Ser. No. 11/936,479, filed Nov. 7, 2007, the disclosure of which is incorporated by reference herein in its entirety.

BACKGROUND INFORMATION

Individuals and businesses often turn to the Internet to purchase goods and services, perform transactions (e.g., financial transactions), and/or perform other operations. Such operations may involve authenticating the individuals and businesses prior to allowing the operations to be performed.

BRIEF DESCRIPTION OF THE DRAWINGS

FIG. 7 is a flow chart of exemplary processing for authenticating a user consistent with exemplary embodiments;

FIGS. 8A-8E illustrate a first example of the processing described with respect to FIG. 7;

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
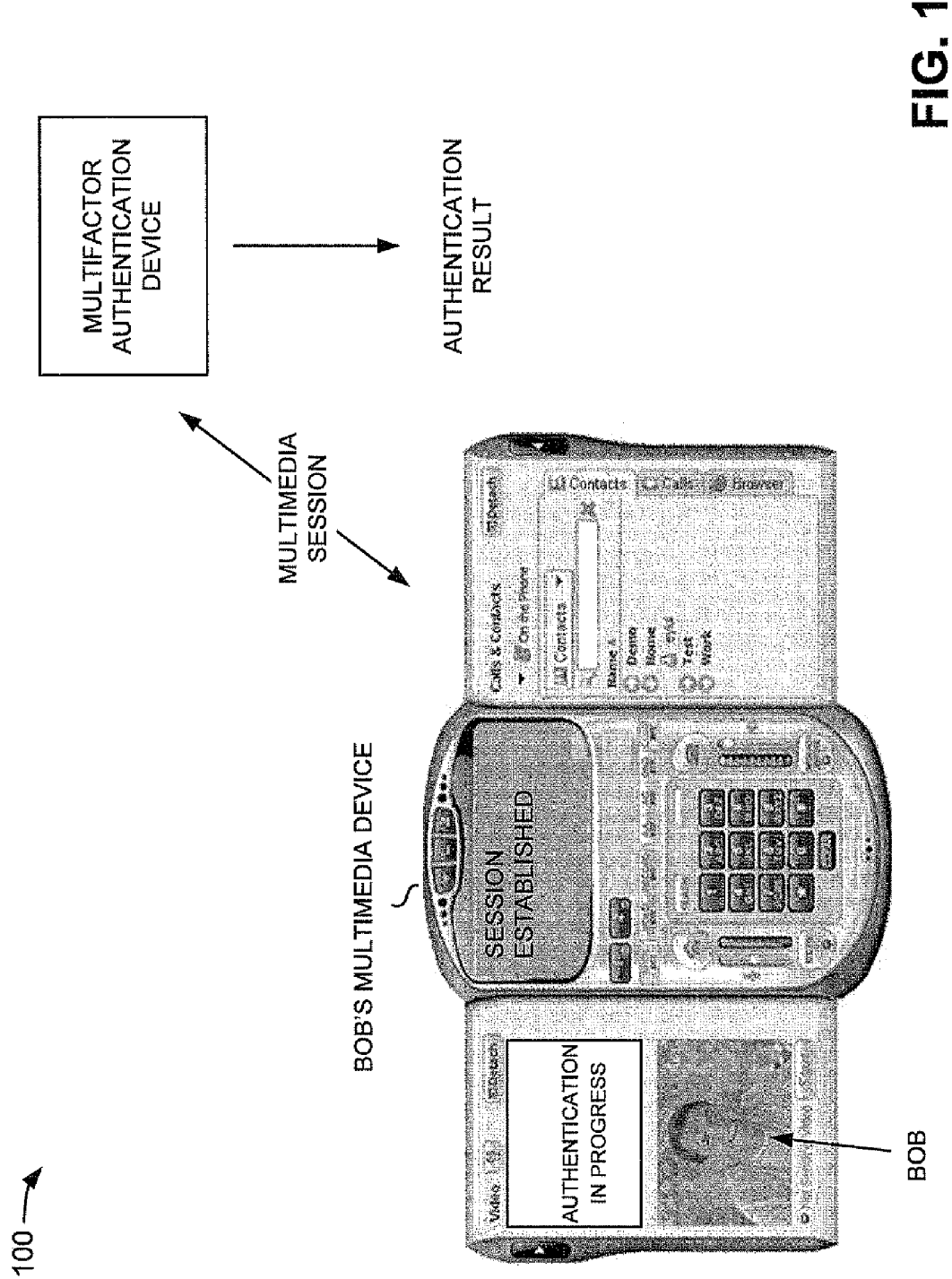
FIG. 1 is an exemplary diagram illustrating a concept described herein.

FIG. 1 is an exemplary diagram illustrating a concept 100 described herein. As illustrated, a user "Bob" may desire to perform an operation, which involves authenticating Bob's identity. When authentication is needed, a multifactor authentication device may, in one exemplary embodiment, establish a multimedia session with Bob's multimedia device. The multifactor authentication device may then use video and audio from the multimedia session to, for example, authenticate Bob facially and via voice authentication, respectively. The multifactor authentication device may combine the results of the facial and voice authentication operations and may provide an authentication result to an appropriate device (not shown). The device may grant or deny Bob's desired operation based on the authentication result.

Figure 2:
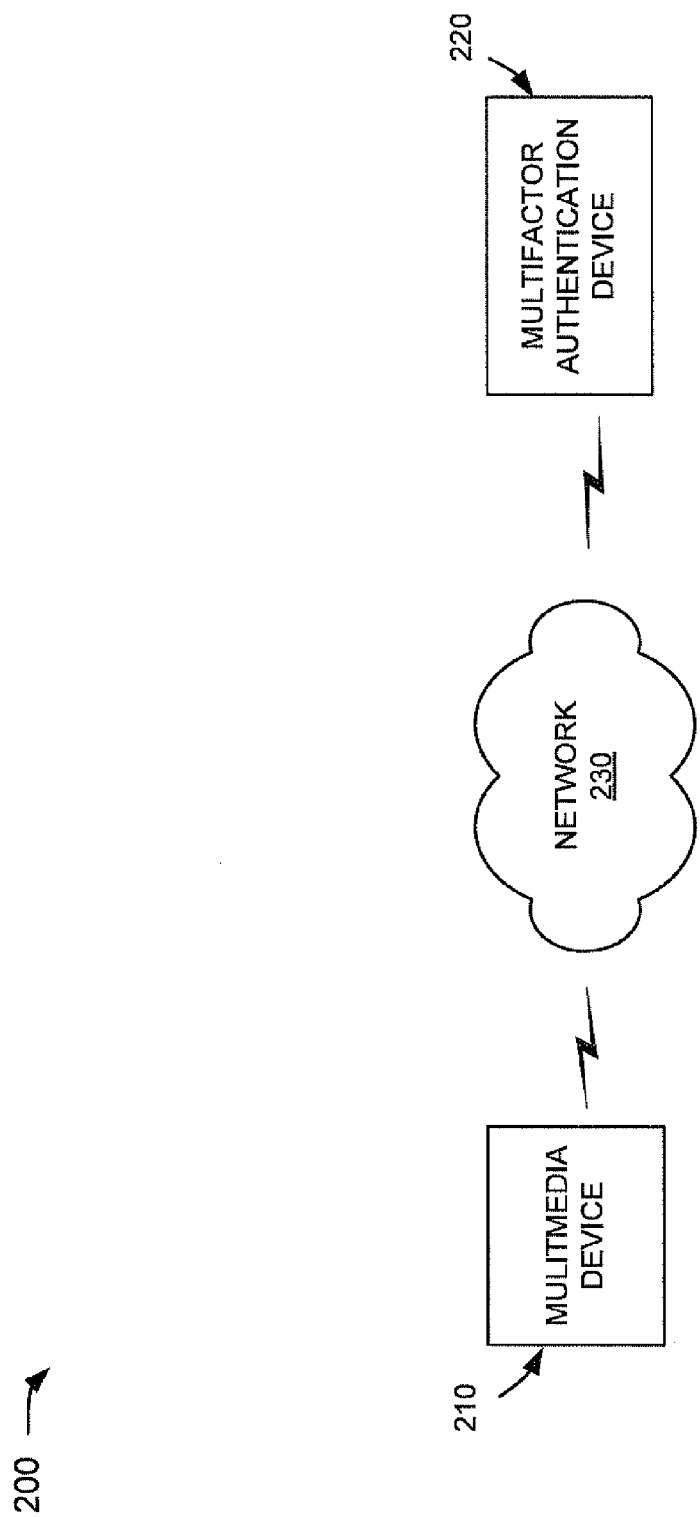
FIG. 2 is an exemplary network in which systems and methods, consistent with exemplary embodiments, may be implemented.

FIG. 2 is an exemplary network 200 in which systems and methods, consistent with exemplary embodiments, may be implemented. As illustrated, network 200 may include a multimedia device 210, a multifactor authentication device 220, and a network 230. The number of multimedia devices 210, multifactor authentication devices 220, and networks 230 illustrated in FIG. 2 is provided for simplicity. In practice, there may be more multimedia devices 210, multifactor authentication devices 220, and/or networks 230.

Multimedia device 210 may include a client entity. An entity may be defined as a device, such as a computer or another type of computation or communication device, a thread or process running on one of these devices, and/or an object executable by one of these devices. In one embodiment, multimedia device 210 may include a personal computer, a laptop, a wireless device (e.g., a cellular telephone, a personal digital assistant (PDA), etc.), and/or any other type of device with which a multimedia session may be established. In addition, multimedia device 210 may include other types of telephone and/or video conferencing devices. For example, multimedia device 210 may also include a POTS telephone, a Session Initiation Protocol (SIP) telephone, an IP Multimedia Subsystem (IMS) client, a set top box that provides voice and/or video sessions, and/or other types of telephone/video conferencing devices. In one embodiment, multimedia device 210 may include one or more authentication devices (e.g., a microphone, a camera, a webcam, a fingerprint scanner, an eye scanner, etc.) or be associated with one or more external authentication devices. Multimedia device 210 may connect to network 230 via wired and/or wireless connections.

Multifactor authentication device 220 may include an entity capable of authenticating a user via multiple biometric authentication operations. As indicated above, an entity may be defined as a device, such as a computer or another type of computation or communication device, a thread or process running on one of these devices, and/or an object executable by one of these devices. In one embodiment, multifactor authentication device 220 may initiate and terminate multimedia sessions with multimedia device 210. Alternatively or additionally, multifactor authentication device 220 may tap into an ongoing multimedia session between multimedia device 210 and another device. Multifactor authentication device 220 may capture biometric identifiers of the user associated with multimedia device 210 from the multimedia session. Multifactor authentication device 220 may connect to network 230 via wired and/or wireless connections.

Network 230 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of network.

One or more components of network 200 may perform one or more of the tasks described as being performed by one or more other components of network 200.

Figure 3:
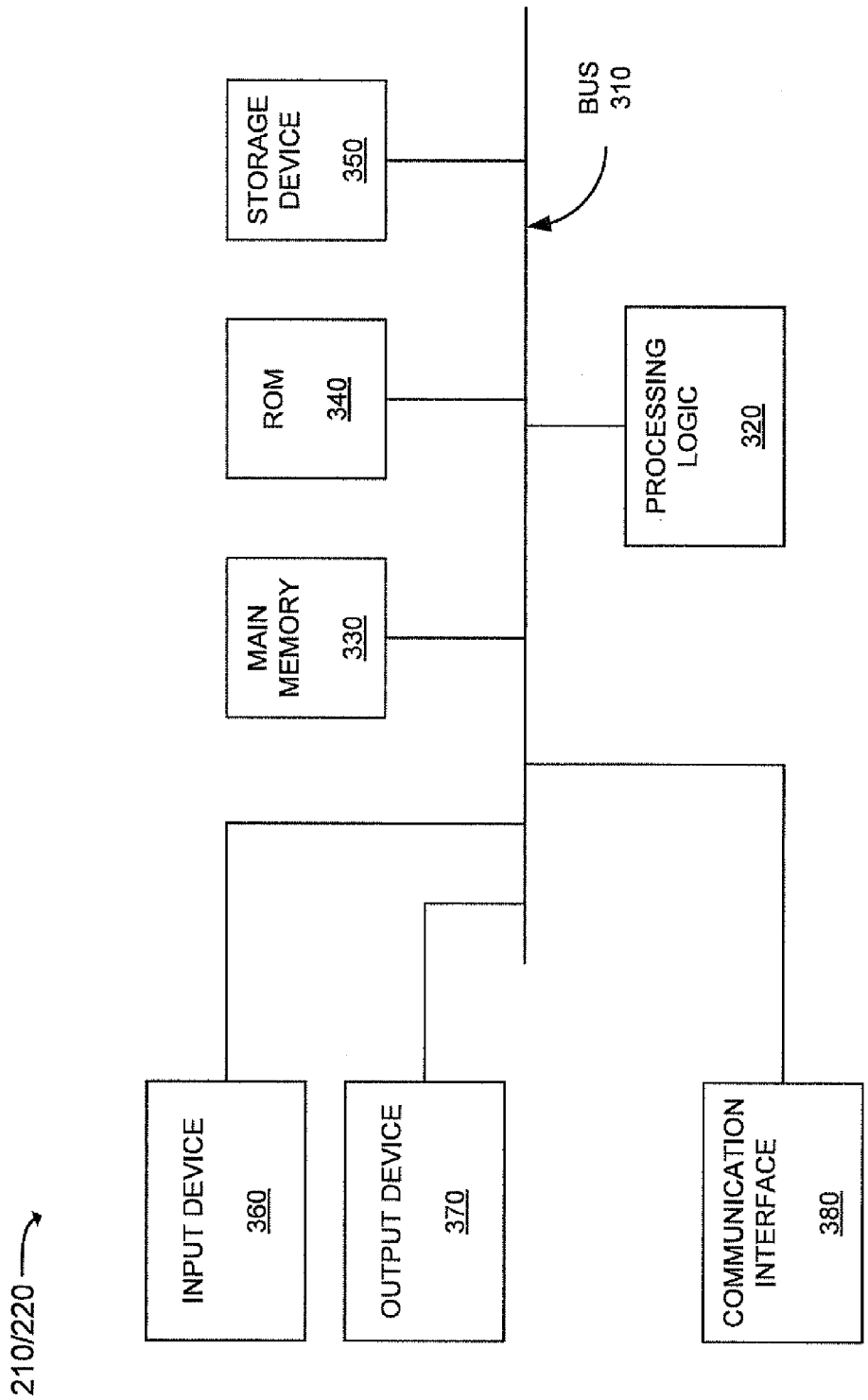
FIG. 3 is an exemplary block diagram of the multimedia device and/or the multifactor authentication device of FIG. 2.

FIG. 3 is an exemplary block diagram of multimedia device 210 and/or multifactor authentication device 220 in one embodiment. As illustrated, multimedia device 210/multifactor authentication device 220 may include a bus 310, processing logic 320, a main memory 330, a read only memory (ROM) 340, a storage device 350, an input device 360, an output device 370, and/or a communication interface 380. In one embodiment, multimedia device 210/multifactor authentication device 220 may include fewer, additional, or different components than illustrated in FIG. 3.

Bus 310 may include a path that permits communication among the components of multimedia device 210/multifactor authentication device 220. Processing logic 320 may include a processor, a microprocessor, or other types of processing logic, such as an application specific integrated circuit (ASIC), a field programmable gate array (FPGA), etc., that may interpret and execute instructions. Main memory 330 may include a random access memory (RAM) or another type of dynamic storage device that may store information and instructions for execution by processing logic 320. ROM 340 may include a ROM device or another type of static storage device that may store static information and instructions for use by processing logic 320. Storage device 350 may include a magnetic and/or optical recording medium and its corresponding drive.

Input device 360 may include a mechanism that permits an operator to input information to multimedia device 210/multifactor authentication device 220, such as a keyboard, a mouse, a pen, voice recognition and/or biometric mechanisms, a camera, an audio/video recorder, etc. Output device 370 may include a mechanism that outputs information to the operator, including a display, a printer, a speaker, etc. Communication interface 380 may include any transceiver-like mechanism that enables multimedia device 210/multifactor authentication device 220 to communicate with other devices and/or systems via a network, such as network 230.

As will be described in detail below, multimedia device 210/multifactor authentication device 220 may perform certain operations. Multimedia device 210/multifactor authentication device 220 may perform these and other operations in response to processing logic 320 executing software instructions contained in a computer-readable medium, such as main memory 330. A computer-readable medium may be defined as a physical and/or logical memory device.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 4:
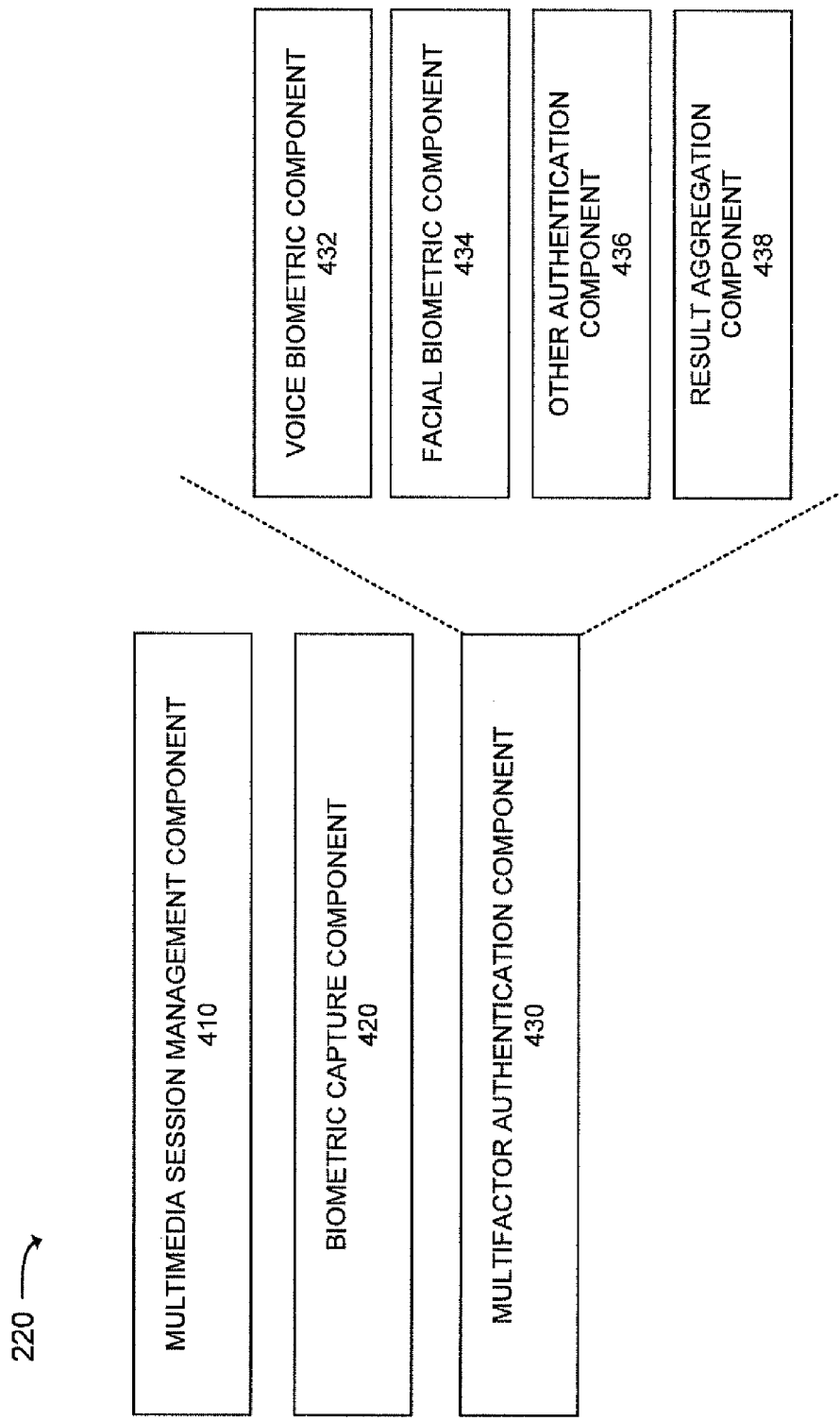
FIG. 4 is an exemplary functional diagram of a portion of the multifactor authentication device of FIG. 2.

FIG. 4 is an exemplary functional diagram of a portion of multifactor authentication device 220 according to an exemplary embodiment. As illustrated, multifactor authentication device 220 may include a multimedia session management component 410, a biometric capture component 420, and a multifactor authentication component 430. In other embodiments, multifactor authentication device 220 may include fewer, additional, or different components than illustrated in FIG. 4.

Multimedia session management component 410 may include one or more components that may establish a multimedia session with multimedia device 210, terminate an ongoing multimedia session, and/or tap into an ongoing multimedia session with or without the knowledge of a user associated with multimedia device 210. Multimedia session management component 410 may establish a multimedia session between multifactor authentication device 220 and multimedia device 210 in response to a command from multimedia device 210 and/or another device. Alternatively, multimedia session management component 410 may automatically establish a multimedia session between multifactor authentication device 220 and multimedia device 210 in response to an event (e.g., every time that a user of multimedia device 210 logs into a particular web site).

Biometric capture component 420 may include one or more components that capture one or more biometric identifiers of a user from a multimedia session. The biometric identifiers may include, for example, facial information, voice information, fingerprint information, eye information, and/or other biometric identifiers. Biometric capture component 420 may receive multimedia session data and extract the biometric identifiers from the multimedia session data.

Multifactor authentication component 430 may include one or more components that perform biometric authentication operations for a group of biometric identifiers (or other forms of authentication operations based on other types of identifiers) and aggregate results of the authentication operations to obtain a multifactor authentication result. Multifactor authentication component 430 may perform the biometric authentication operations in real time. The multifactor authentication result may represent whether a user (associated with the group of biometric (or other) identifiers) has been properly authenticated. The multifactor authentication result may also include one or more biometric result scores that can be delivered to an external system that makes the final user authentication determination.

As illustrated in FIG. 4, multifactor authentication component 430 may include a voice biometric component 432, a facial biometric component 434, an other authentication component 436, and a result aggregation component 438. In other embodiments, multifactor authentication component 430 may include fewer, additional, or different components than illustrated in FIG. 4.

Voice biometric component 432 may receive voice information (e.g., a spoken utterance) and information identifying a user with which the voice information is associated and perform a voice biometric operation on the voice information to determine the degree to which the voice information matches a stored voice biometric sample (which may include an audio file, a voice print, and/or other information) associated with the user. The voice print may include, for example, a mathematical model based on a user's vocal tract, physiological vocal characteristics, and/or other information/data. In one embodiment, voice biometric component 432 may produce a voice authentication score (e.g., from "1" (indicating that it is unlikely that the voice information matches the stored voice biometric sample for the user) to "100" (indicating that it is very likely that the voice information matches the stored voice biometric sample for the user)). Other ranges of values may alternatively be used. For example, voice biometric component 432 may produce a score of "1" if voice biometric component 432 determines it is likely that the voice information matches the stored voice biometric sample and a score of "0" if voice biometric component 432 determines it is unlikely that the voice information matches the stored voice biometric sample.

Facial biometric component 434 may receive facial information (e.g., an image or a video stream) and information identifying a user with which the facial information is associated and perform a facial recognition operation on the facial information to determine the degree to which the facial information matches a stored facial biometric sample (which may include an image file, a video file, a facial print, and/or other information) associated with the user. The facial print may include, for example, a mathematical representation of the user's face and/or other information. In one embodiment, facial biometric component 434 may produce a facial authentication score (e.g., from "1" (indicating that it is unlikely that the facial information matches the stored facial biometric sample for the user) to "100" (indicating that it is very likely that the facial information matches the stored facial biometric sample for the user)). Other ranges of values may alternatively be used. For example, facial biometric component 434 may produce a score of "1" if facial biometric component 434 determines it is likely that the facial information matches the stored facial biometric sample and a score of "0" if facial biometric component 434 determines it is unlikely that the facial information matches the stored facial biometric sample.

Other authentication component 436 may include one or more components that may perform other types of authentication operations. For example, other authentication component 436 may include a fingerprint biometric component to authenticate a fingerprint of the user, an eye scan biometric component to authenticate the eye (e.g., a retina) of the user, and/or other types of authentication components. Alternatively or additionally, other authentication component 436 may include an identifier/password component to authenticate an identifier and password received from the user. In one embodiment, each other authentication component in other authentication component 436 may produce an authentication score that indicates the degree with which the authentication operation indicates that the user is who he/she says he/she is.

Result aggregation component 438 may receive authentication scores from voice biometric component 432, facial biometric component 434, and other authentication component 436 and may combine the different authentication scores to obtain a multifactor authentication result. In one exemplary embodiment, result aggregation component 438 may determine the multifactor authentication result as follows:

multifactor authentication result=score 1+score 2+ . . . +score N, where each of score 1 to score N corresponds to a different authentication score from voice biometric component 432, facial biometric component 434, and/or other authentication component 436. In this exemplary embodiment, if the multifactor authentication result exceeds a configurable threshold, it may be determined that the user is properly authenticated. Result aggregation component 438 may determine the multifactor authentication result in other ways or may provide the authentication scores to an external system that makes the final authentication determination.

One or more components of the above portion of multifactor authentication device 220 may perform one or more of the tasks described as being performed by one or more other components of the above portion of multifactor authentication device 220.

Figure 5:
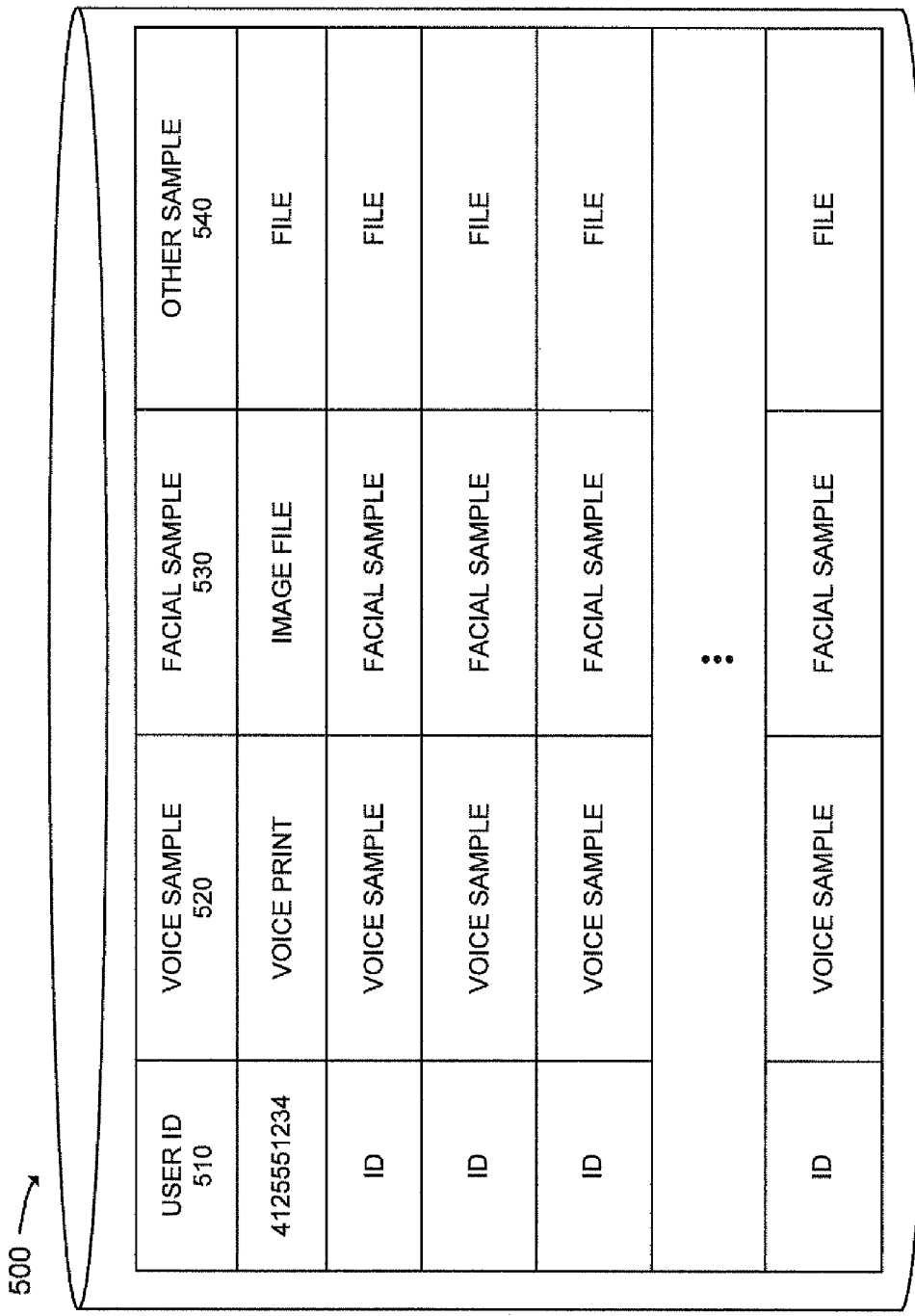
FIG. 5 is an exemplary diagram of a portion of a database that may be associated with the multifactor authentication device of FIG. 2.

FIG. 5 is an exemplary diagram of a portion of a database 500 that may be associated with multifactor authentication device 220. While only one database is described below, it will be appreciated that database 500 may include multiple databases stored locally at multifactor authentication device 220, or stored at one or more different and possibly remote locations (e.g., at multimedia device 210 and/or another device).

As illustrated, database 500 may maintain a group of entries in the following exemplary fields: a user identification (ID) field 510, a voice sample field 530, a facial sample field 530, and an other sample field 540. Database 500 may maintain additional or different information that may be used in performing multiple biometric authentication operations.

User identification field 510 may store a sequence of characters that uniquely identifies a user. The sequence of characters may include, for example, an address associated with the user (e.g., a telephone number, Internet Protocol (IP) address, etc.), the user's name, and/or other information.

Voice sample field 520 may store one or more voice samples for the user identified in user identification field 510. The voice sample(s) may be obtained by, for example, prompting the user to say one or more words or phrases during a registration process, recording the user's voice response(s) as audio files, and storing the audio files in field 520. Alternatively or additionally, a user may upload one or more audio file(s) to database 500 to be used in a voice biometric operation. Voice sample field 520 may alternatively or additionally store a mathematical representation of a user's voice as a biometric voice print.

Facial sample field 530 may store one or more facial samples for the user identified in user identification field 510. The facial sample(s) may be obtained by, for example, establishing a multimedia session with the user during a registration process, capturing the one or more image files from the multimedia session, and storing one or more image files in field 530. Alternatively or additionally, a user may upload one or more image file(s) to database 500 to be used in a facial biometric operation. Facial sample field 530 may alternatively or additionally store a mathematical representation of user's face as a biometric facial print.

Other sample field 540 may include one or more sub-fields. Each sub-field may store one or more files for the user identified in user identification field 510 to be used in a different authentication operation (e.g., a fingerprint authentication operation, an eye scan authentication operation, etc.). The file(s) may be obtained by, for example, prompting the user to perform, for example, a fingerprint scan or eye scan during a registration process, capturing the fingerprint or eye scan, and storing information relating to the fingerprint or eye scan as a file in field 540. Alternatively or additionally, a user may upload one or more file(s) to database 500 to be used in the different authentication operation.

Figure 6:
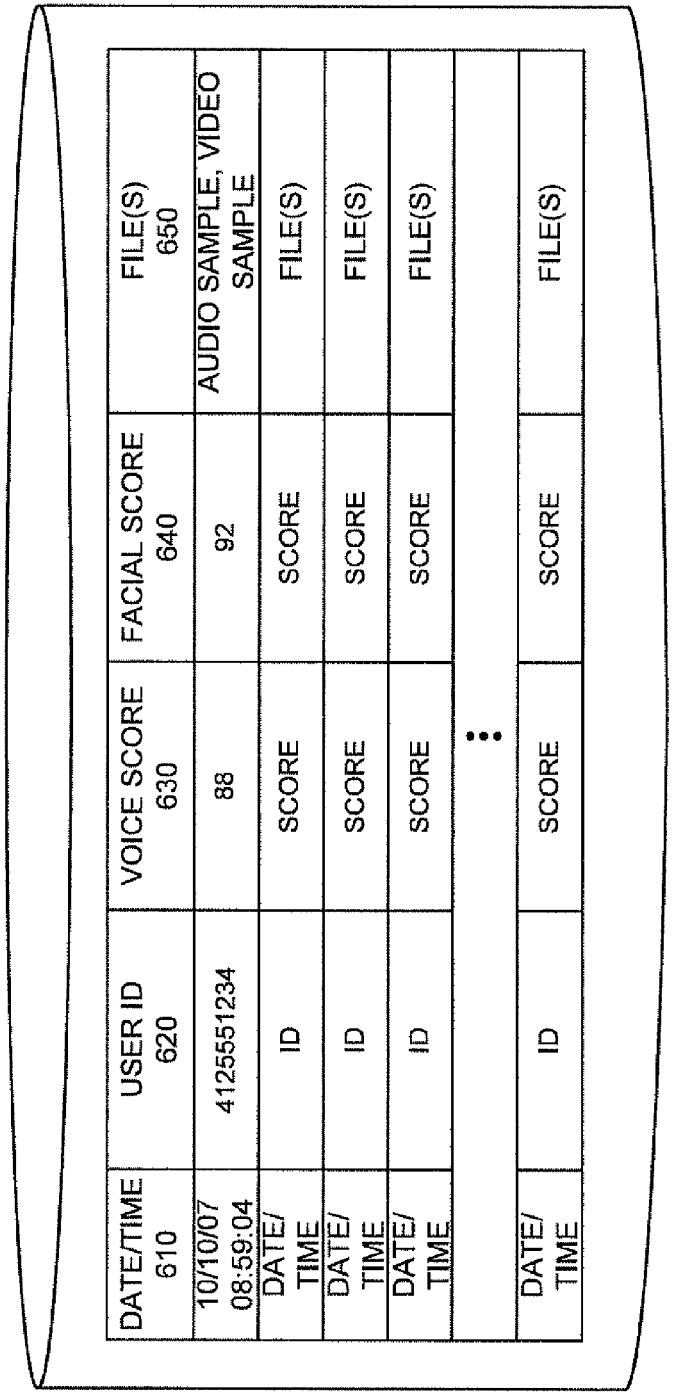
FIG. 6 is an exemplary diagram of a portion of another database that may be associated with the multifactor authentication device of FIG. 2.

FIG. 6 is an exemplary diagram of a portion of a second database 600 that may be associated with multifactor authentication device 220. While only one database is described below, it will be appreciated that database 600 may include multiple databases stored locally at multifactor authentication device 220, or stored at one or more different and possibly remote locations.

As illustrated, database 600 may maintain a group of entries in the following exemplary fields: a date/time field 610, a user identification (ID) field 620, a voice score field 630, a facial score field 640, and a file(s) field 650. Database 600 may maintain additional or different information than illustrated in FIG. 6. For example, database 600 may include fields that store other authentication scores.

Date/time field 610 may store information identifying a date and time when an authentication operation was performed. Date/time field 610 may store the date and time in various formats. User identification field 620 may store a sequence of characters that uniquely identifies a user. The sequence of characters may include, for example, an address associated with the user (e.g., a telephone number, Internet Protocol (IP) address, etc.), the user's name, and/or other information.

Voice score field 630 may store a value representing a score that was obtained from a voice biometric operation for the user identified in field 620 during the authentication operation performed on the date/time identified in field 610. Facial score field 640 may store a value representing a score that was obtained from a facial biometric operation for the user identified in field 620 during the authentication operation performed on the date/time identified in field 610. File(s) field may store one or more voice samples (e.g., audio files, voice prints, etc. or links to audio files, voice prints, etc.) and/or one or more facial samples (e.g., video files, image files, facial prints, etc. or links to video files, image files, facial prints, etc.) that were obtained from the user identified in user identification field 620 during the authentication operation. The voice samples may be obtained by, for example, prompting the user to say one or more words or phrases and recording or biometrically measuring (e.g., in real time) the user's voice response(s). The facial sample (e.g., video file(s), image file(s), facial biometric print(s), etc.) may be obtained from a video or multimedia session in which the user was participating during the authentication operation.

FIG. 7 is a flow chart of exemplary processing for authenticating a user consistent with exemplary embodiments. In one embodiment, the processing of FIG. 7 may be performed by multifactor authentication device 220. In another embodiment, some or all of the processing described below may be performed by another device, such as multimedia device 210 or another device, or combination of devices.

Processing may begin with multifactor authentication device 220 receiving a request for performing an authentication operation (block 710). In one embodiment, if a user desires to perform an operation with another device for which an authentication operation is required, the device may transmit a request to multifactor authentication device 220 indicating that multifactor authentication device 220 is to authenticate the user. In one embodiment, the request may include information relating to the user (e.g., an address, such as a telephone number or uniform resource identifier (URI)). The request may further include information identifying which authentication operations are to be performed (e.g., a voice biometric operation and a facial biometric operation).

In one embodiment, multifactor authentication device 220 may, in response to receiving the request, automatically establish a multimedia session with multimedia device 210 (block 720). For example, multifactor authentication device 220 (e.g., via multimedia session management component 410) may obtain an address for multimedia device 210 (e.g., from the received request, by requesting the address from the user, or from another source) and may establish a multimedia session with multimedia device 210 using the obtained address.

In another embodiment, multifactor authentication device 220 may tap into an ongoing multimedia session between multimedia device 210 and another device. For example, multimedia session management component 410 may receive the multimedia session from the other device and/or may become a party to the multimedia session with or without the knowledge of the user.

Multifactor authentication device 220 may obtain multiple biometric identifiers from the user (block 730). For example, multifactor authentication device 220 (e.g., via biometric capture component 420) may perform real-time biometric analysis or record a video of the user associated with multimedia device 210 during the established multimedia session or perform real-time biometric analysis or extract video from a recorded signal that includes both video and audio. Moreover, multifactor authentication device 220 (e.g., biometric capture component 420) may perform real-time biometric analysis or record the user's voice during the established multimedia session or perform real-time biometric analysis or extract audio from a recorded signal that includes both video and audio. Multifactor authentication device 220 may perform real-time biometric analysis upon or record all or a portion of the multimedia session with the user to create one or more video files and one or more audio files. In one embodiment, multifactor authentication device 220 may ask the user a predetermined set of questions during the multimedia session. For example, multifactor authentication device 220 may ask the user to say certain words or phrases (e.g., words or phrases for which voice prints for the user have already been recorded). The video file(s) may represent a facial identifier for the user and the voice print(s) may represent a verbal identifier for the user. In addition, multifactor authentication device 220 may receive a fingerprint scan (e.g., by requesting the user to perform a fingerprint scan at multimedia device 210), an eye scan (e.g., by requesting the user to perform an eye scan at multimedia device 210), and/or other types of biometric identifiers from the user during the multimedia session.

Multifactor authentication device 220 may perform authentication operations using the biometric identifiers to obtain authentication scores (block 740). For example, multifactor authentication device 220 (e.g., voice biometric component 432, facial biometric component 434, and/or other authentication component 436) may perform a voice biometric operation using audio obtained from the user during the multimedia session, a facial biometric operation using facial information obtained from the user during the multimedia session, a fingerprint biometric operation using a fingerprint scan obtained from the user during the multimedia session, an eye recognition operation using an eye scan obtained from the user during the multimedia session, and/or other biometric authentication operations using other biometric identifiers obtained during the multimedia session. The biometric authentication operations may involve comparing the biometric identifiers obtained from the user during the multimedia session with stored biometric identifiers (e.g., stored voice prints, audio files, facial prints, video (or image) files, etc. stored in database 500). Each biometric authentication operation may result in an authentication score, which may reflect the degree to which the obtained biometric identifier matches the stored biometric identifier. In one embodiment, the authentication score may be a value between "1" and "100" (or another value), with a "1" indicating that it is unlikely that the obtained biometric identifier matches the stored biometric identifier and a "100" indicating that it is likely that the obtained biometric identifier matches the stored biometric identifier.

Multifactor authentication device 220 may store the authentication scores and the biometric identifiers obtained during the multimedia session in a database, such as database 600 (block 750). For example, multifactor authentication component 430 may store an identifier associated with the user (e.g., a telephone number, URI, etc.) in a user identification field 620, a score of a voice biometric operation in a voice score field 630, a score of a facial biometric operation in a facial score field 640, and the obtained biometric samples in a file(s) field 650, along with a date/time that the biometric authentication operations were performed.

Multifactor authentication device 220 may determine a multifactor authentication result using the authentication scores (block 760). For example, result aggregation component 438 may combine the authentication scores from the different biometric authentication operations to obtain the multifactor authentication result. In one embodiment, result aggregation component 438 may add the authentication scores from the different biometric authentication operations to obtain the multifactor authentication result. Other ways of combining the authentication scores may alternatively be used.

Multifactor authentication device 220 may determine whether the multifactor authentication result exceeds a threshold (block 770). In one embodiment, the threshold may be a configurable threshold. If the multifactor authentication result exceeds the threshold (block 770—YES), multifactor authentication device 220 may send a message to another device that the user has been properly authenticated (block 780). For example, multifactor authentication device 220 may send a message to the device for which an authentication operation was required indicating that the user's identity has been properly authenticated. Multifactor authentication device 220 may also send a message to multimedia device 210 indicating that the user's identity has been properly authenticated. Alternatively, multifactor authentication device 220 may deliver the authentication scores to an external system that makes the authentication determination.

If the multifactor authentication result does not exceed the threshold (block 770—NO), multifactor authentication device 220 may send a message to another device that the user has not been properly authenticated (block 790). For example, multifactor authentication device 220 may send a message to the device for which an authentication operation was required indicating that the user's identity has not been properly authenticated. Multifactor authentication device 220 may also send a message to multimedia device 210 indicating that the user's identity has not been properly authenticated. Multifactor authentication device 220 may also attempt fallback authentication using different authentication mechanisms or by routing the multimedia session to a call center agent for further authentication processing.

Figure 8C:
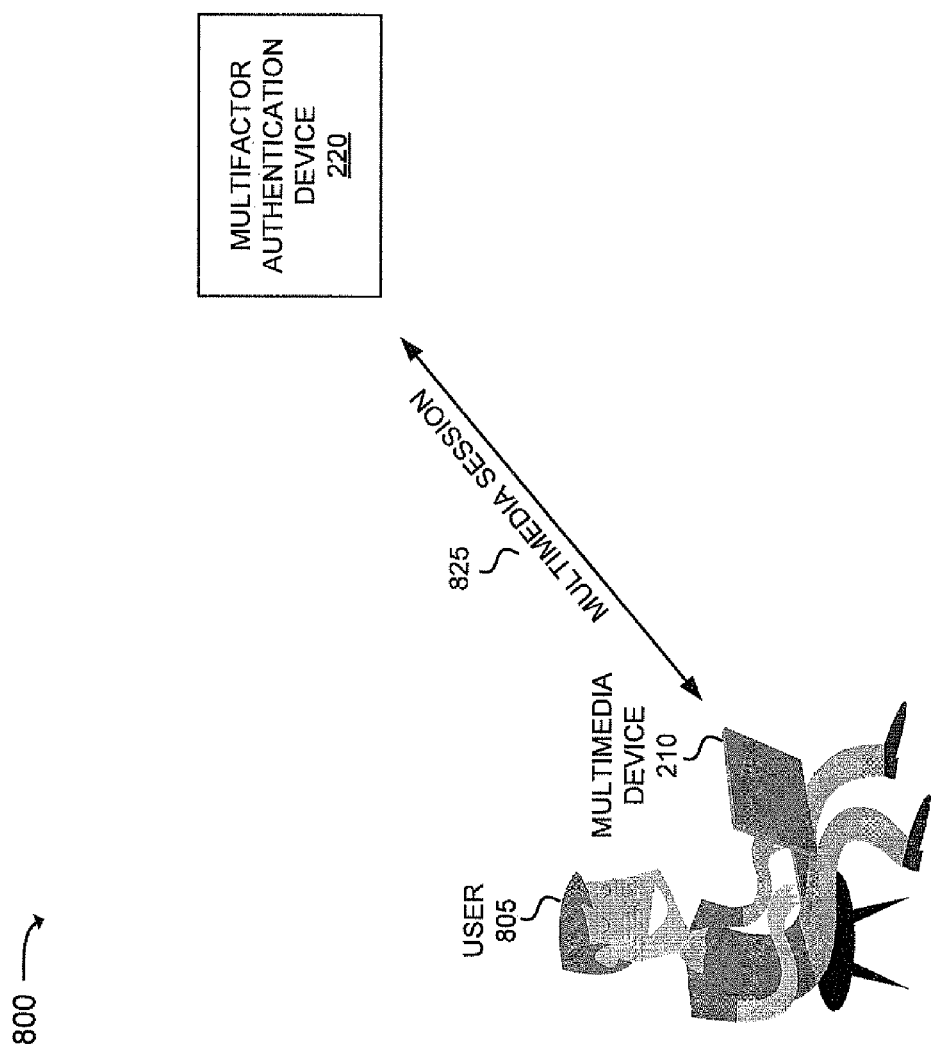

The following example 800 of FIGS. 8A-8E illustrates the processing described above with respect to FIG. 7. Assume that a user 805 is associated with a multimedia device 210, as illustrated in FIG. 8A. Assume further that user 805 has accessed a broker 810 via a network, such as network 230, and has sent a request 815 that $25,000 be transferred from broker 810 to a bank account associated with user 805.

In response to receiving request 815, assume that broker 810 requires that the user be authenticated via a voice biometric operation and a facial biometric operation. Thus, as illustrated in FIG. 8B, broker 810 may, in response to request 815, send a request 820 to authenticate user 805 to multifactor authentication device 220. Request 820 may identify user 805 (e.g., an address for the user, such as a telephone number or URI) and may possibly identify the particular biometric authentication operations that are to be performed. In example 800, request 820 may identify that a voice biometric operation and a facial biometric operation are to be performed.

Figure 8D:
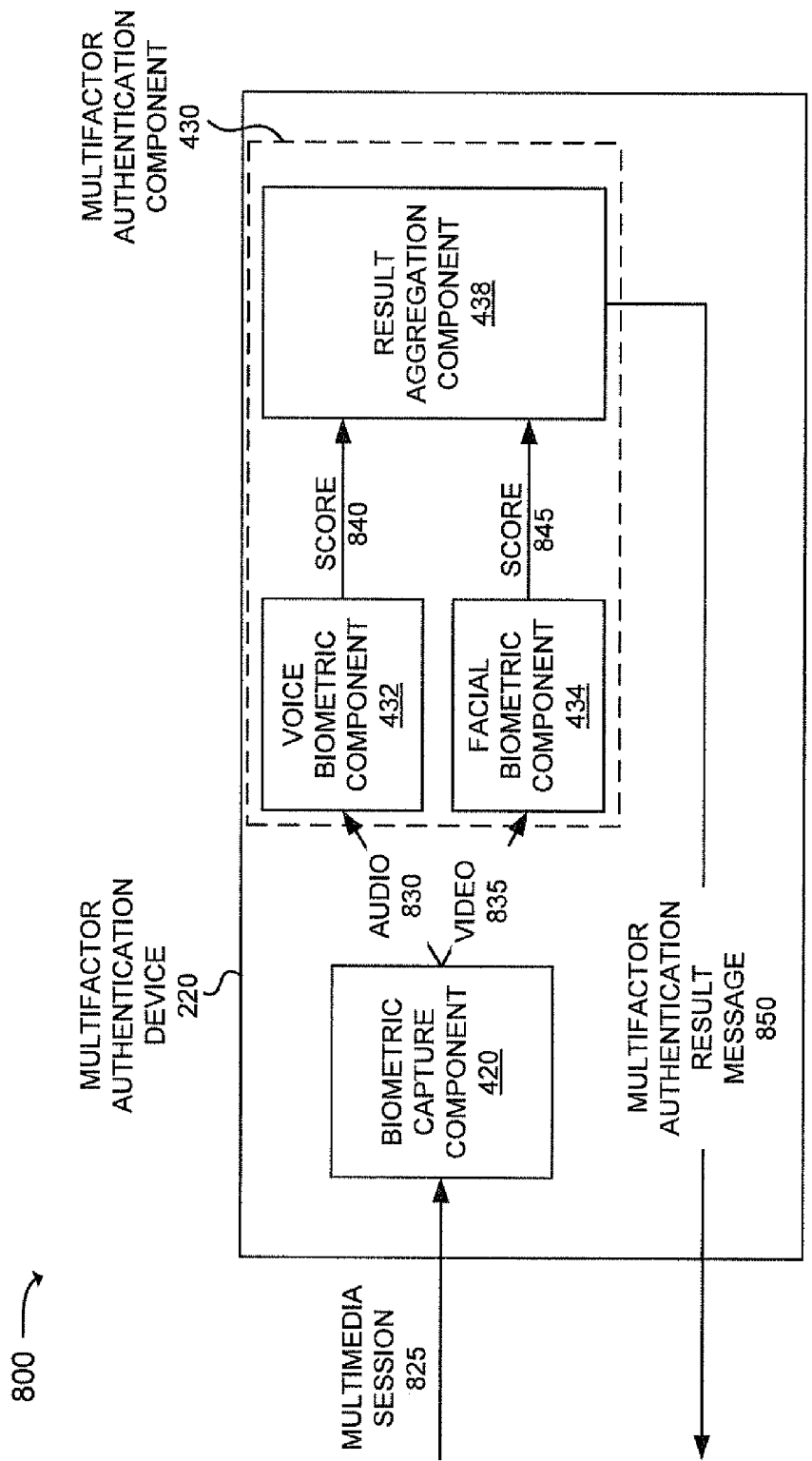

In response to receiving request 820, multifactor authentication device 220 may establish a multimedia session 825 with multimedia device 210, as illustrated in FIG. 8C. Multimedia session 825 may be established in a known manner. Once established, multifactor 220 may perform the voice biometric operation and facial biometric operation using information obtained from multimedia session 825. For example, as illustrated in FIG. 8D, biometric capture component 420 may receive multimedia session 825 and may separate an audio portion 830 of multimedia session 825 from a video portion 835 of multimedia session 825. Biometric capture component 420 may forward audio portion 830 to voice biometric component 432 of multifactor authentication component 430 and video portion 835 to facial biometric component 434 of multifactor authentication component 430. Voice biometric component 432 may compare audio portion 830 to, for example, a stored voice biometric print for user 805 to obtain a score 840, which may represent how closely audio portion 830 matches the stored voice biometric print for user 805. Voice biometric component 432 may transmit score 840 to result aggregation component 438. Similarly, facial biometric component 434 may compare a facial image in video portion 830 to, for example, a stored facial biometric print for user 805 to obtain a score 845, which may represent how closely the facial image of video portion 830 matches the stored facial biometric print for user 805. Facial biometric component 434 may transmit score 845 to result aggregation component 438.

Result aggregation component 438 may combine scores 840 and 845 (e.g., by adding score 840 to score 845) to obtain a multifactor authentication result and compare the multifactor authentication result to a threshold to authenticate the user. If the multifactor authentication result exceeds the threshold, multifactor authentication device 220 may determine that user 805 has been properly authenticated. If, on the other hand, the multifactor authentication result does not exceed the threshold, multifactor authentication device 220 may determine that user 805 has not been properly authenticated. Multifactor authentication device 220 may send a multifactor authentication result message 850 that represents whether user 805 has been properly authenticated. Alternatively, multifactor authentication device 220 may send the biometric authentication scores to an external system for authentication determination.

Figure 8E:
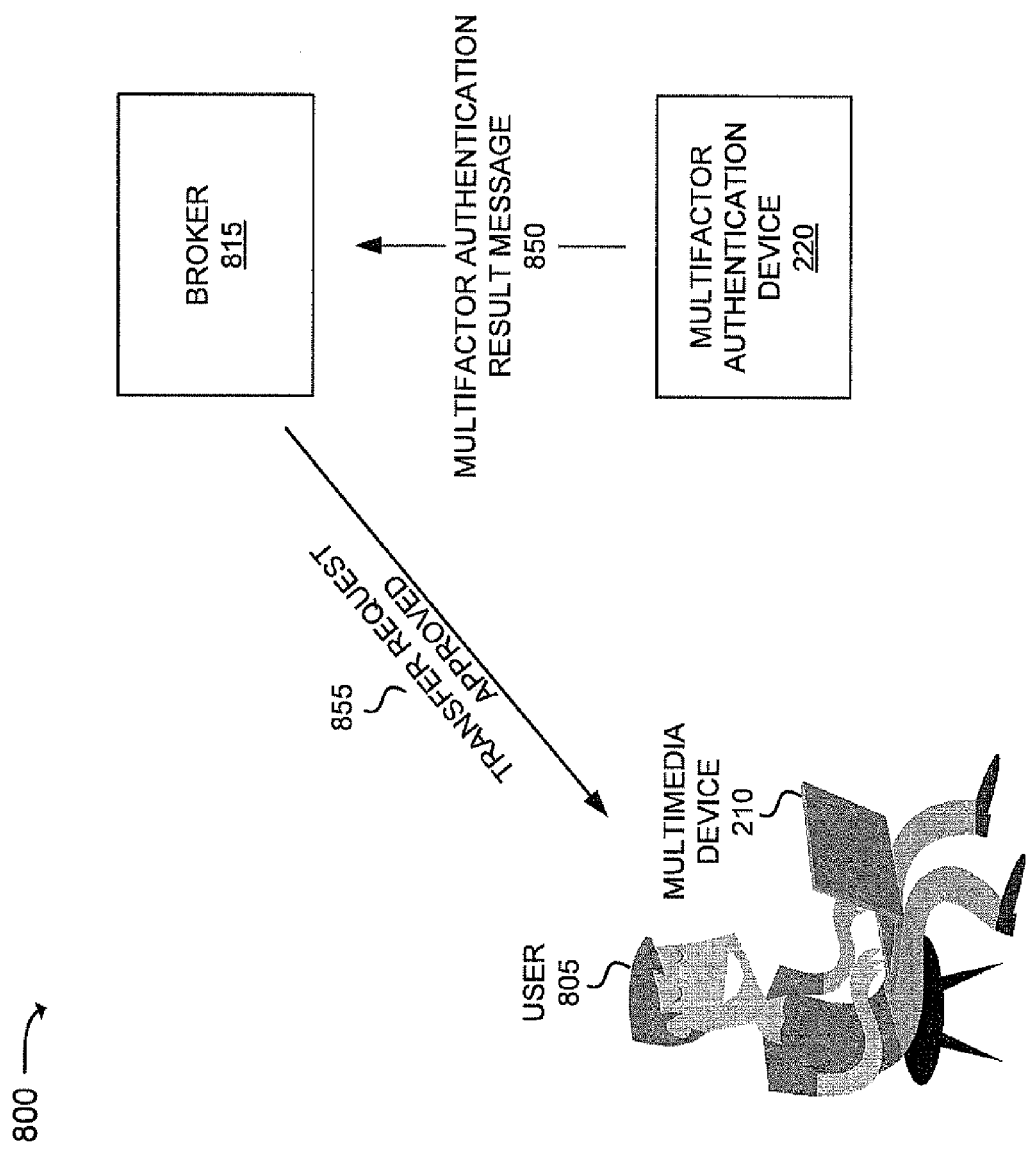

Multifactor authentication device 220 may send multifactor authentication result message 850 to broker 815, as illustrated in FIG. 8E. Multifactor authentication device 220 may terminate multimedia session 825. If multifactor authentication result message 850 indicates that user 805 has been properly authenticated, broker 815 may send a message 855 to multimedia device 210 indicating that the transfer request has been approved. Broker 815 may perform the user-requested operation (i.e., the transfer of $25,000 to user 805's bank account). If, on the other hand, multifactor authentication result message 850 indicates that user 805 has not been properly authenticated, broker 815 may send a message to multimedia device 210 indicating that the transfer request has been denied.

Figure 9A:
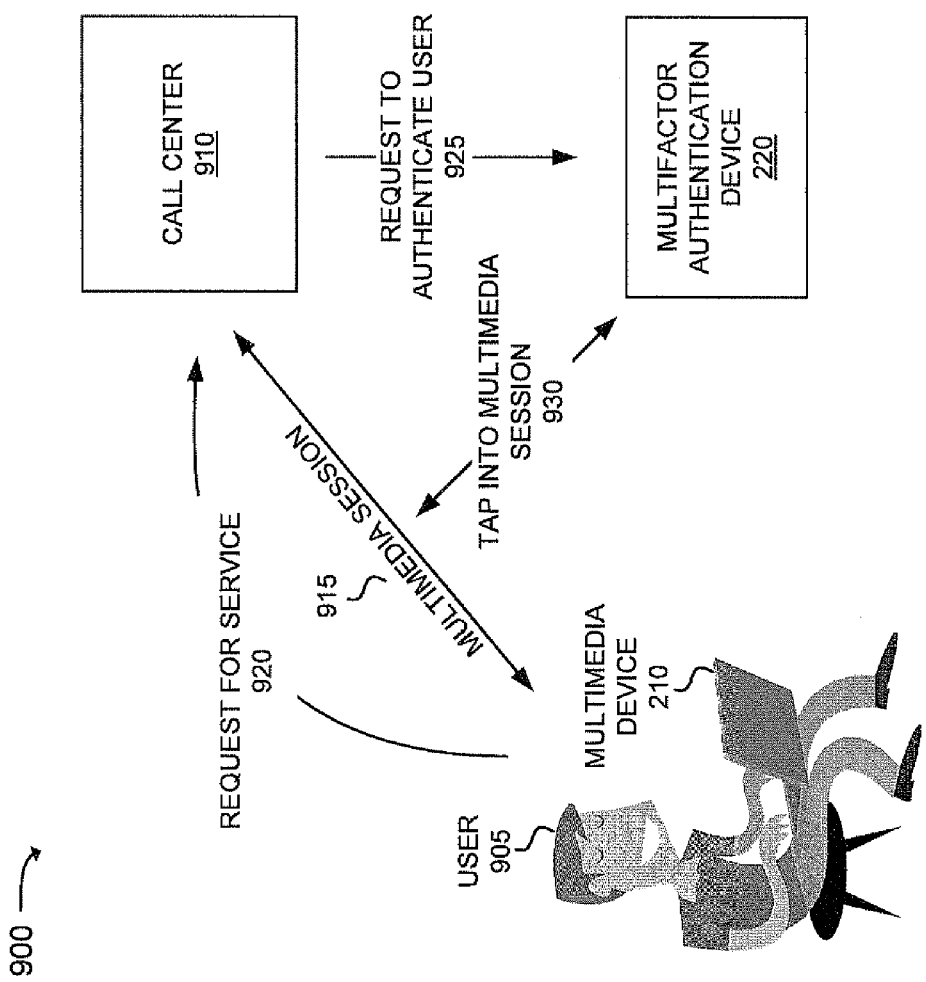
FIGS. 9A-9C illustrate a second example of the processing described with respect to FIG. 7.
Figure 9B:
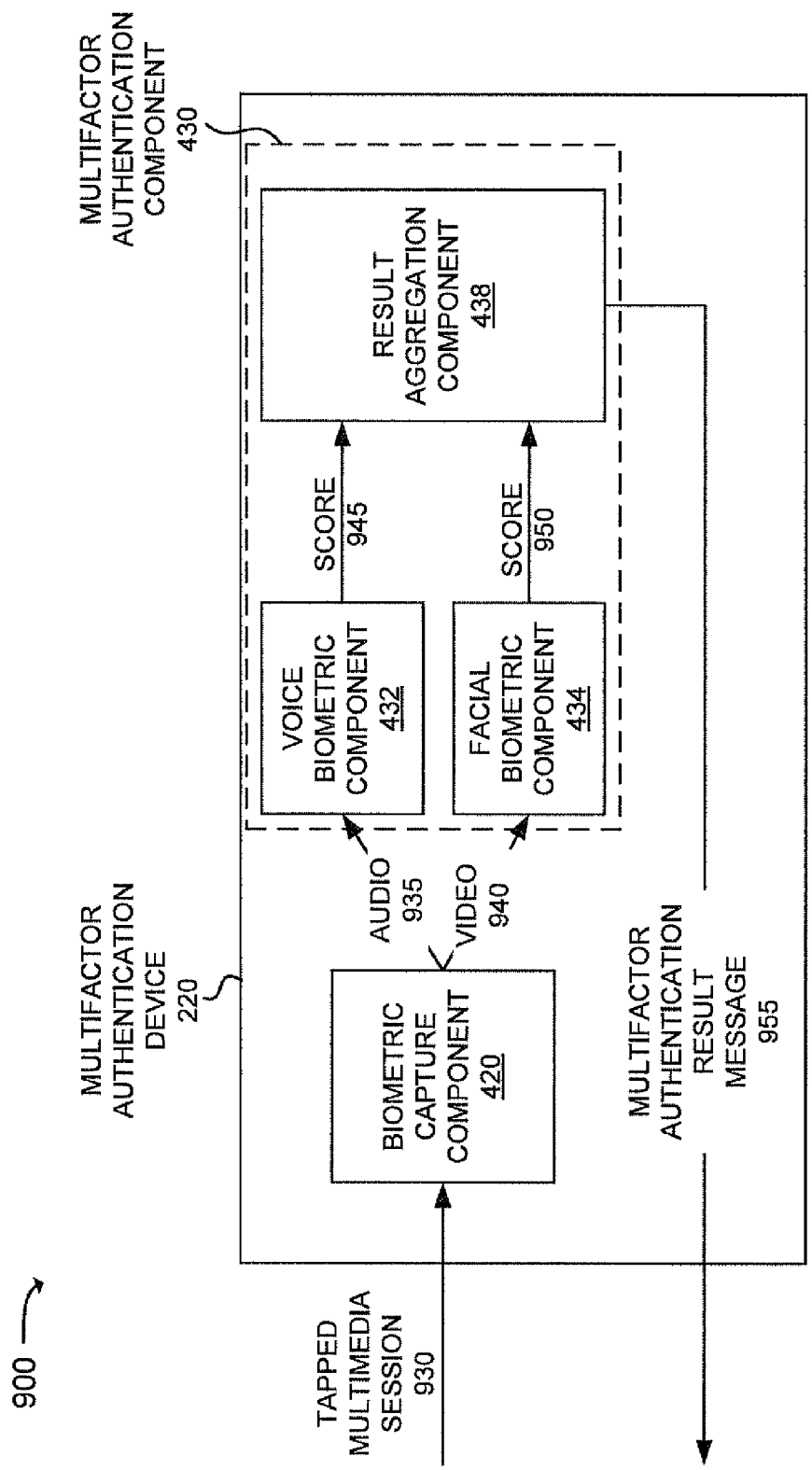
Figure 9C:
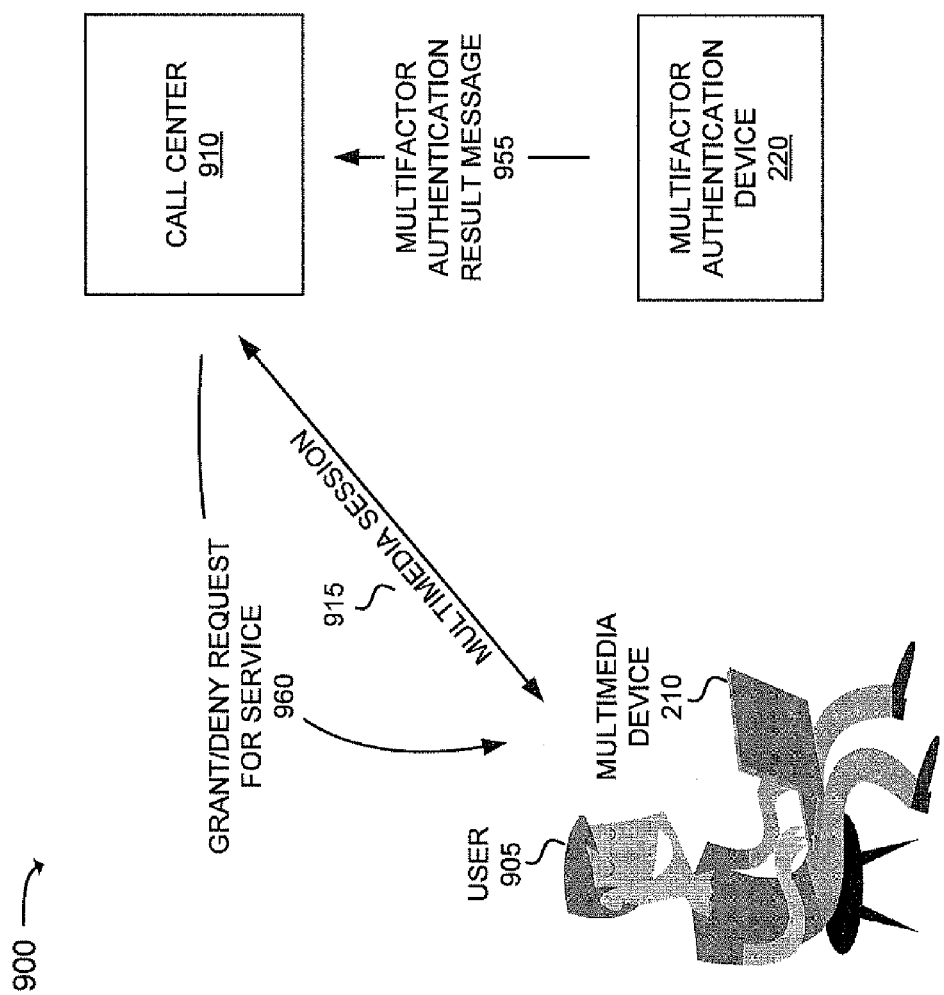

The following example 900 of FIGS. 9A-9C illustrates another example of the processing described above with respect to FIG. 7. Assume that a user 905 is associated with a multimedia device 210, as illustrated in FIG. 9A. Assume further that user 905 has established a multimedia session 915 with a call center 910 via a network, such as network 230, and has sent a request 920 for a service (e.g., a request to change to user 905's telephone service, such as by adding a calling feature).

In response to receiving request 920, assume that call center 910 requires that the user be authenticated via a voice biometric operation and a facial biometric operation. Thus, as illustrated in FIG. 9A, call center 910 may, in response to request 920, send a request 925 to authenticate user 905 to multifactor authentication device 220. Request 925 may identify user 905 (e.g., an address for the user, such as a telephone number or URI) and may possibly identify the particular biometric authentication operations that are to be performed. In example 900, request 925 may identify that a voice biometric operation and a facial biometric operation are to be performed.

In response to receiving request 925, multifactor authentication device 220 may tap 930 into multimedia session 915 between multimedia device 210 and call center 910, as illustrated in FIG. 9A. Multifactor authentication device 220 may tap into multimedia session 915 in a known manner. Multifactor authentication device 220's participation in multimedia session 915 may be known or unknown to user 905.

Once tapped into multimedia session 915, multifactor authentication device 220 may perform the voice biometric operation and facial biometric operation using information obtained from multimedia session 915. For example, as illustrated in FIG. 9B, biometric capture component 420 may receive tapped multimedia session 930 and may separate an audio portion 935 of tapped multimedia session 930 from a video portion 940 of tapped multimedia session 930. Biometric capture component 420 may forward audio portion 935 to voice biometric component 432 of multifactor authentication component 430 and video portion 940 to facial biometric component 434 of multifactor authentication component 430. Voice biometric component 432 may, for example, compare audio portion 935 to a stored voice biometric print for user 905 to obtain a score 945, which may represent how closely biometric analysis of audio portion 935 matches the stored voice biometric print for user 905. Voice biometric component 432 may transmit score 945 to result aggregation component 438. Similarly, facial biometric component 434 may, for example, compare a biometric analysis of the facial image in video portion 940 to a stored facial biometric print for user 905 to obtain a score 950, which may represent how closely the facial image of video portion 940 matches the stored facial biometric print for user 905. Facial biometric component 434 may transmit score 950 to result aggregation component 438.

Result aggregation component 438 may combine scores 945 and 950 (e.g., by adding score 945 to score 950) to obtain a multifactor authentication result and compare the multifactor authentication result to a threshold to authenticate the user. If the multifactor authentication result exceeds the threshold, multifactor authentication device 220 may determine that user 905 has been properly authenticated. If, on the other hand, the multifactor authentication result does not exceed the threshold, multifactor authentication device 220 may determine that user 905 has not been properly authenticated. Multifactor authentication device 220 may send a multifactor authentication result message 955 that represents whether user 905 has been properly authenticated. Alternatively, multifactor authentication device 220 may send the biometric authentication scores to an external system for authentication determination.

Multifactor authentication device 220 may send multifactor authentication result message 955 to call center 910, as illustrated in FIG. 9C. Multifactor authentication device 220 may terminate tap 930 into multimedia session 915. Call center 910 may send a message 960 to multimedia device 210 indicating whether the service request has been granted or denied. If granted, call center 910 may provide the user-requested service (i.e., adding the calling feature to the user 905's telephone service).

Figure 10:
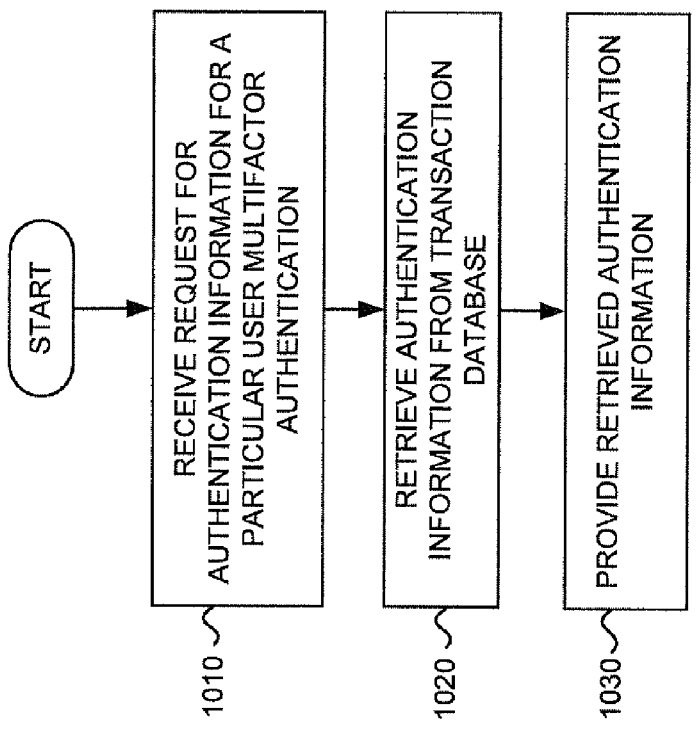
FIG. 10 is a flow chart of exemplary processing for providing authentication information consistent with exemplary embodiments.

In some situations, a user may attempt to dispute whether the user requested (or performed) a particular transaction that involved a multifactor authentication operation. In these situations, it may be desirable to obtain information relating to the multifactor authentication operation. FIG. 10 is a flow chart of exemplary processing for providing authentication information consistent with exemplary embodiments. In one embodiment, the processing of FIG. 10 may be performed by multifactor authentication device 220. In another embodiment, some or all of the processing described below may be performed by another device or combination of devices.

Processing may begin with multifactor authentication device 220 receiving a request for authentication information relating to a multifactor authentication operation (block 1010). The request may be received, for example, from a device that performed a transaction for the user. In one embodiment, the request may include information identifying the user (e.g., an address, such as a telephone number or URI) and a date and time that the multifactor authentication operation was performed.

Multifactor authentication device 220 may retrieve the requested authentication information (block 1020). For example, multifactor authentication device 220 may, in response to receiving the request, use the date and time information and the information identifying the user to lookup authentication information from database 600. The authentication information may include, for example, the files that were stored for the particular authentication operation. In the example illustrated in FIG. 6, multifactor authentication device 220 may retrieve one or more of the file(s) stored in file(s) field 650 for the date/time and user identified in the request. The files may include, for example, an audio file, a video file, a fingerprint scan file, an eye scan file, and/or other types of files stored for the particular multifactor authentication operation identified in the request. In addition or alternatively, multifactor authentication device 220 may retrieve authentication scores from database 600.

Multifactor authentication device 220 may provide the retrieved authentication information to the requesting device (block 1030). The requesting device may then use the authentication information to verify (e.g., to the user) that the user actually requested (or performed) the particular transaction.

Embodiments described herein provide multiple biometric authentication operations to verify a user's identity.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 7 and 10, the order of the acts may be varied in other embodiments. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a first device, a request to authenticate a user;
establishing, by the first device and based on receiving the request, a multimedia session between the first device and a second device associated with the user;
capturing, by the first device during the multimedia session, different types of biometric information of the user; and
authenticating, by the first device, the user using the captured different types of biometric information.

2. The method of claim 1, further comprising:
performing a plurality of biometric authentication operations using the captured different types of biometric information;
where authenticating the user includes authenticating the user based on performing the plurality of biometric authentication operations.

3. The method of claim 1, where the captured different types of biometric information include two or more of:
voice biometric information,
facial biometric information,
fingerprint scan information, or
eye scan information,
the method further comprising:
performing a plurality of biometric authentication operations using the two or more of the voice biometric information, the facial biometric information, the fingerprint scan information, or the eye scan information;
where authenticating the user includes authenticating the user based on performing the plurality of biometric authentication operations.

4. The method of claim 1, further comprising:
performing at least two of:
a voice biometric operation,
a facial biometric operation,
a fingerprint biometric operation, or
an eye biometric operation;
where authenticating the user includes authenticating the user based on performing the at least two of the voice biometric operation, the facial biometric operation, the fingerprint biometric operation, or the eye biometric operation.

5. The method of claim 1, where receiving the request includes:
receiving a request to authenticate the user for a financial transaction, and
where the request is received from a third device that is different than the first device and the second device, the third device being associated with an entity that is associated with the financial transaction.

6. The method of claim 1, where the request is received from a third device that is different than the first device and the second device,
the method further comprising:
transmitting, to the third device, a message indicating whether the user is properly authenticated.

7. The method of claim 1, further comprising:
storing, prior to receiving the request, biometric information of the user; and
comparing the different types of biometric information to the stored biometric information of the user,
where authenticating the user includes authenticating the user based on comparing the different types of biometric information to the stored biometric information of the user.

8. A non-transitory computer-readable medium storing instructions, the instructions comprising:
one or more instructions which, when executed by at least one processor of a first device, cause the at least one processor to:
capture different types of biometric information, of a user, from a multimedia session established with a second device associated with the user;
perform a plurality of biometric authentication operations using the different types of biometric information; and
authenticate the user based on performing the plurality of biometric authentication operations.

9. The non-transitory computer-readable medium of claim 8, the instructions further comprising:
one or more instructions to obtain a plurality of scores based on performing the plurality of biometric authentication operations; and
one or more instructions to authenticate the user based on the obtained plurality of scores.

10. The non-transitory computer-readable medium of claim 8, the instructions further comprising:
one or more instructions to establish the multimedia session with the second device based on a request to authenticate the user; and
one or more instructions to terminate the multimedia session with the second device after the different types of biometric information have been captured.

11. The non-transitory computer-readable medium of claim 8, where the request is received from a third device that is different than the first device and the second device,
the instructions further comprising:
one or more instructions to transmit, the third device, a message indicating whether the user is properly authenticated.

12. The non-transitory computer-readable medium of claim 8, where the different types of biometric information include at least two of:
voice biometric information,
facial biometric information,
fingerprint scan information, or
eye scan information.

13. The non-transitory computer-readable medium of claim 12, where the one or more instructions to perform the plurality of biometric authentication operations include:
one or more instructions to perform a voice biometric operation using the voice biometric information when the voice biometric information is captured;
one or more instructions perform a facial biometric operation using the facial biometric information when the facial biometric information is captured;
one or more instructions perform a fingerprint biometric operation using the fingerprint scan information when the fingerprint scan information is captured; or
one or more instructions perform an eye biometric operation using the eye scan information when the eye scan information is captured.

14. The non-transitory computer-readable medium of claim 8, the instructions further comprising:
one or more instructions to compare information, obtained based on performing the plurality of biometric authentication operations, to a threshold; and one or more instructions perform determine that the user is properly authenticated when the information, obtained based on performing the plurality of biometric authentication operations, exceeds the threshold.

15. A device comprising:
a memory to store instructions; and
a processor to execute the instructions to:
- receive a request to authenticate a user,
- capture based on the request and from a multimedia session established with another device associated with the user:
  - video information identifying the user, and
  - audio information identifying the user,
- perform biometric authentication operations using the video information and the audio information, and
- authenticate the user based on performing the biometric authentication operations.

16. The device of claim 15, where, when performing the biometric authentication operations, the processor is to perform:
- a voice biometric operation using the audio information, and
- a facial biometric operation using the video information.

17. The device of claim 15, where the request includes a request to authenticate the user for a transaction,
- where the device corresponds to a first device and the other device associated with the user corresponds to a second device,
- where the request is received from a third device that is different than the first device and the second device, the third device being associated with an entity that is associated with the transaction,
- where, when authenticating the user, the processor is further to:
  - determine that the user is properly authenticated, and
- where the processor is further to:
  - transmit, to the third device, information indicating that the user is properly authenticated,
  - where the third device authorizes the transaction based on the information indicating that the user is properly authenticated.

18. The device of claim 15, where, when authenticating the user, the processor is further to:
- combine results of performing the biometric authentication operations to obtain an authentication result,
- compare the authentication result to a threshold, and
- determine that the user is properly authenticated when the authentication result exceeds the threshold.

19. The device of claim 15, where the device corresponds to a first device and the other device associated with the user corresponds to a second device,
- where the multimedia session is established between the second device and a third device that is different than the first device and the second device, and
- where the processor is further to:
  - tap into the multimedia session established between the second device and the third device, based on receiving the request, and
  - capture the audio information and the video information from the multimedia session established between the second device and the third device.

20. The device of claim 15, where the processor is further to:
- store, prior to receiving the request, different types of biometric information of the user, and
- where, when performing the biometric authentication operations, the processor is to:
- compare the audio information and the video information to the stored different types of biometric information.

* * * * *